United States Patent [19]
Groves et al.

[11] Patent Number: 5,833,124
[45] Date of Patent: Nov. 10, 1998

[54] FLUID DISPENSING DEVICE

[75] Inventors: Bruce I. Groves, London, Canada; Rodney L. Laible, Bennington, Nebr.

[73] Assignee: Pfizer Inc., New York, N.Y.

[21] Appl. No.: 852,554

[22] Filed: May 7, 1997

Related U.S. Application Data

[60] Provisional application No. 60/017,999, May 21, 1996.

[51] Int. Cl.⁶ ........................................................ B67D 5/38
[52] U.S. Cl. ............................ 222/158; 222/205; 222/211
[58] Field of Search ..................................... 222/158, 205, 222/207, 211, 481.5

[56] References Cited

U.S. PATENT DOCUMENTS

| | | |
|---|---|---|
| 524,206 | 8/1894 | Keepers . |
| 1,684,171 | 9/1928 | Davis . |
| 3,246,807 | 4/1966 | Micallef ................................. 222/207 |
| 4,105,142 | 8/1978 | Morris, Jr. ............................. 222/158 |
| 4,747,521 | 5/1988 | Saffron .................................. 222/205 |
| 4,830,226 | 5/1989 | Kong ..................................... 222/205 |
| 5,303,081 | 4/1994 | Davenport ............................. 222/211 |
| 5,363,991 | 11/1994 | Reyman ................................ 222/207 |
| 5,381,930 | 1/1995 | Kalabakas ............................. 222/205 |
| 5,649,647 | 7/1997 | Kodarar ................................ 222/205 |

FOREIGN PATENT DOCUMENTS

| | | |
|---|---|---|
| 568579 | 6/1958 | Belgium . |
| 0335505 | 10/1989 | European Pat. Off. . |
| 335505 | 10/1989 | European Pat. Off. . |
| 0552043 | 7/1993 | European Pat. Off. . |
| 2637366 | 10/1988 | France . |
| 1075967 | 2/1960 | Germany . |
| 3241054 | 5/1984 | Germany . |
| 3618559 | 12/1987 | Germany . |
| 3819098 | 1/1989 | Germany . |
| 9202091 | 5/1992 | Germany . |
| 777862 | 6/1957 | United Kingdom . |
| 1488355 | 10/1977 | United Kingdom . |
| 2038779 | 7/1980 | United Kingdom . |

*Primary Examiner*—Joseph A. Kaufman
*Attorney, Agent, or Firm*—Peter C. Richardson; Paul H. Ginsburg; Grover F. Fuller, Jr.

[57] ABSTRACT

A fluid dispensing device for use with a fluid reservoir having a cup having a bottom wall and a top wall, the top wall including an orifice to permit removal of fluid from the cup and with the top wall having a threaded axial opening, the bottom wall being coupled to a conduit adapted for communication with fluid in a reservoir; and a column rotatably positioned in the axial opening and extending therefrom into and out of the cup, the column including an orifice positioned in the cup, the column including a threaded portion being cooperative with the threaded axial opening such that the position of the column orifice in the cup can be varied through a vertical range of movement by rotation of the column, and the column further including a tubular portion being in fluid communication with the column orifice and with the conduit and movable relative to the conduit while substantially maintaining a seal therebetween throughout the vertical range of movement of the orifice in the cup.

15 Claims, 5 Drawing Sheets

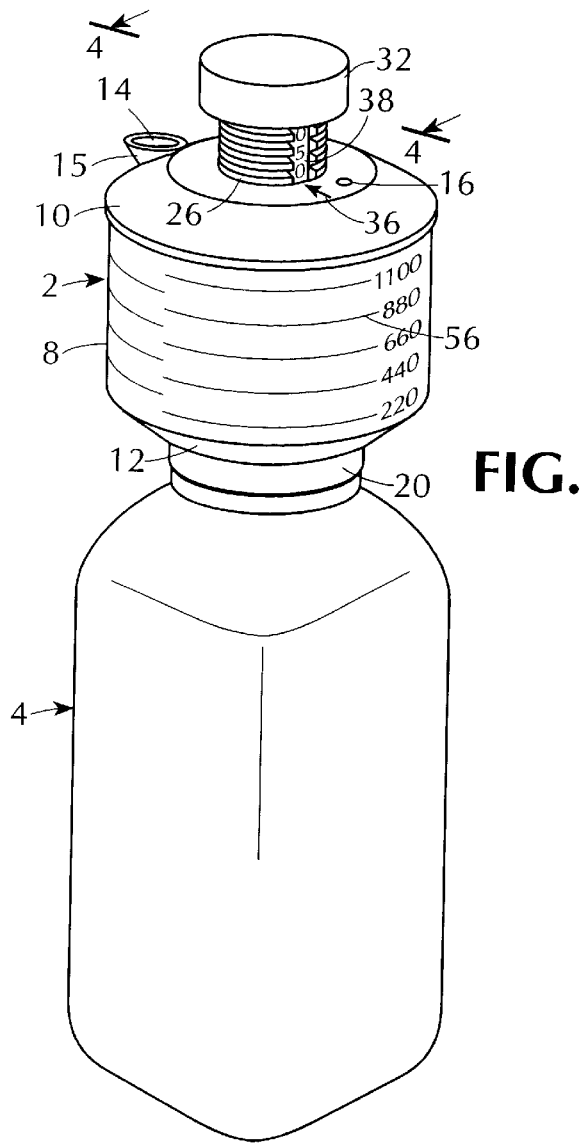
FIG. 1
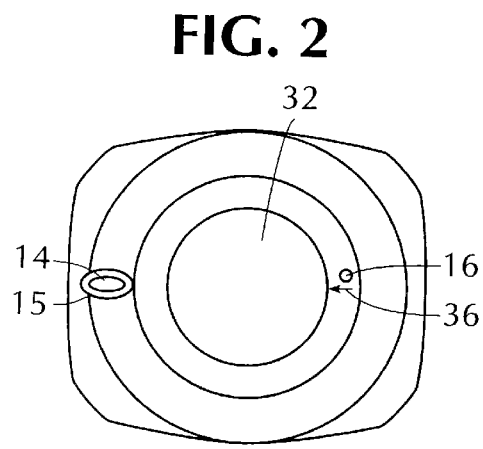
FIG. 2
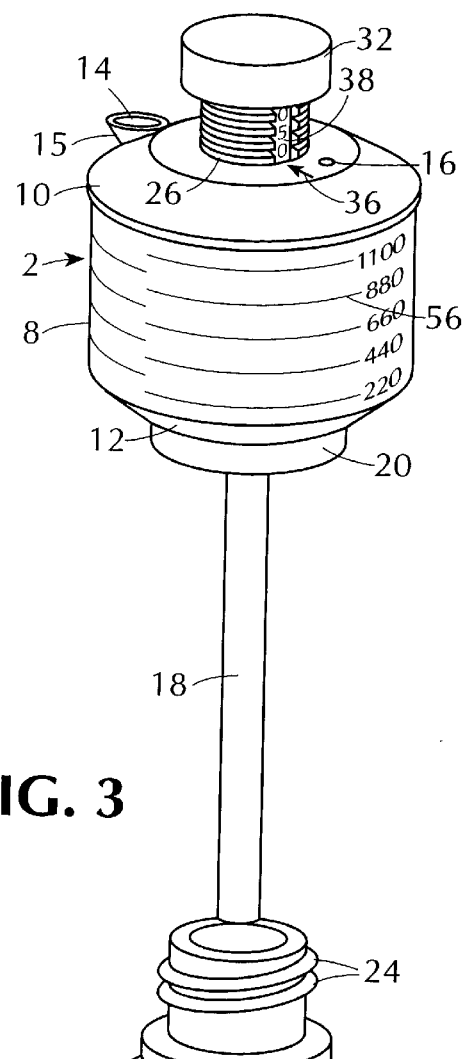
FIG. 3
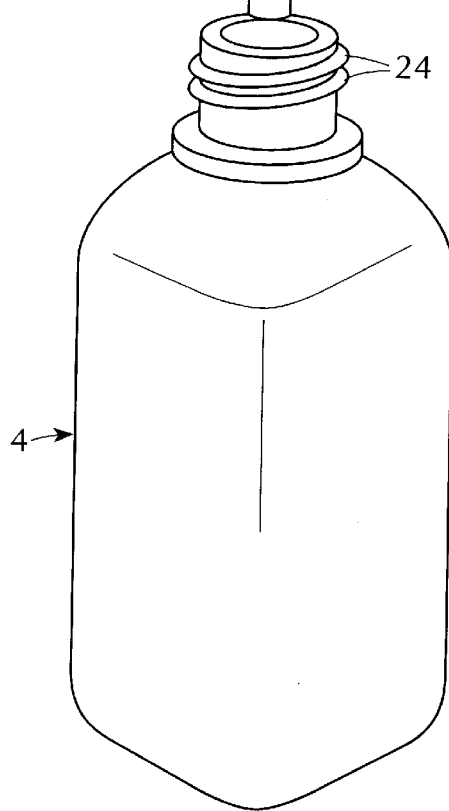

FLUID DISPENSING DEVICE

This non-provisional application is based upon and claims priority from Provisional application Ser. No. 60/017,999 filed May 21, 1996.

BACKGROUND OF THE INVENTION

The present invention relates to a fluid dispensing device which is used to measure desired amount of fluid from a bottle, such as a deformable resilient plastic bottle, and dispense that measured amount.

Various measuring vessels have been used where fluid is urged into a measuring vessel from a reservoir. The modes of urging the fluid include the use of a pump, e.g. U.S. Pat. Nos. 524,206 and 1,684,171, the use of plastic deformable squeeze-type bottle, e.g. Belgian Patent 568579, and use of negative pressure generated by the measuring vessel itself, e.g. U.S. Pat. No. 5,381,930.

The measuring vessels have used different mechanical configurations in order to permit the adjustment of the amount of fluid dispensed in the vessel, e.g. U.S. Pat. No. 4,747,521 and EPO 335505.

SUMMARY OF THE INVENTION

The present invention relates to a fluid dispensing device comprising a cup having a bottom wall and a top wall, the top wall including an orifice to permit removal of fluid from the cup and with the top wall having a threaded axial opening, the bottom wall being coupled to a conduit adapted for communication with fluid in a reservoir; and a column rotatably positioned in the axial opening and extending therefrom into and out of the cup, the column including an orifice positioned in the cup, the column including a threaded portion being cooperative with the threaded axial opening such that the position of the column orifice in the cup can be varied through a range of movement by rotation of the column, and the column further including a tubular portion being in fluid communication with the column orifice and with the conduit and movable relative to the conduit while substantially maintaining a seal therebetween throughout the range of movement of the orifice in the cup.

In a preferred embodiment, the present invention includes means for coupling the present invention to a reservoir, preferably a bottle, more preferably a deformable resilient squeeze-type bottle. The coupling means preferably has a threaded portion on the present invention and a complementary threaded portion on the reservoir.

In a preferred embodiment, the top wall includes an air opening which is substantially diametrically opposed to the top wall orifice.

In a preferred embodiment, the central column orifice is substantially radially 90° from the top wall orifice. Also the central column includes a plurality of column orifices.

In a preferred embodiment, the conduit has a curvature along its length so as to the distal end of the conduit in a direction diametrically opposed to the top wall orifice.

BRIEF DESCRIPTION OF THE DRAWINGS

FIG. 1 is a perspective view of the invention in operative position mounted to a bottle;

FIG. 2 is a top view of the invention of FIG. 1;

FIG. 3 is an exploded perspective view of the invention of FIG. 1;

DETAILED DESCRIPTION OF THE INVENTION

Figure 4:
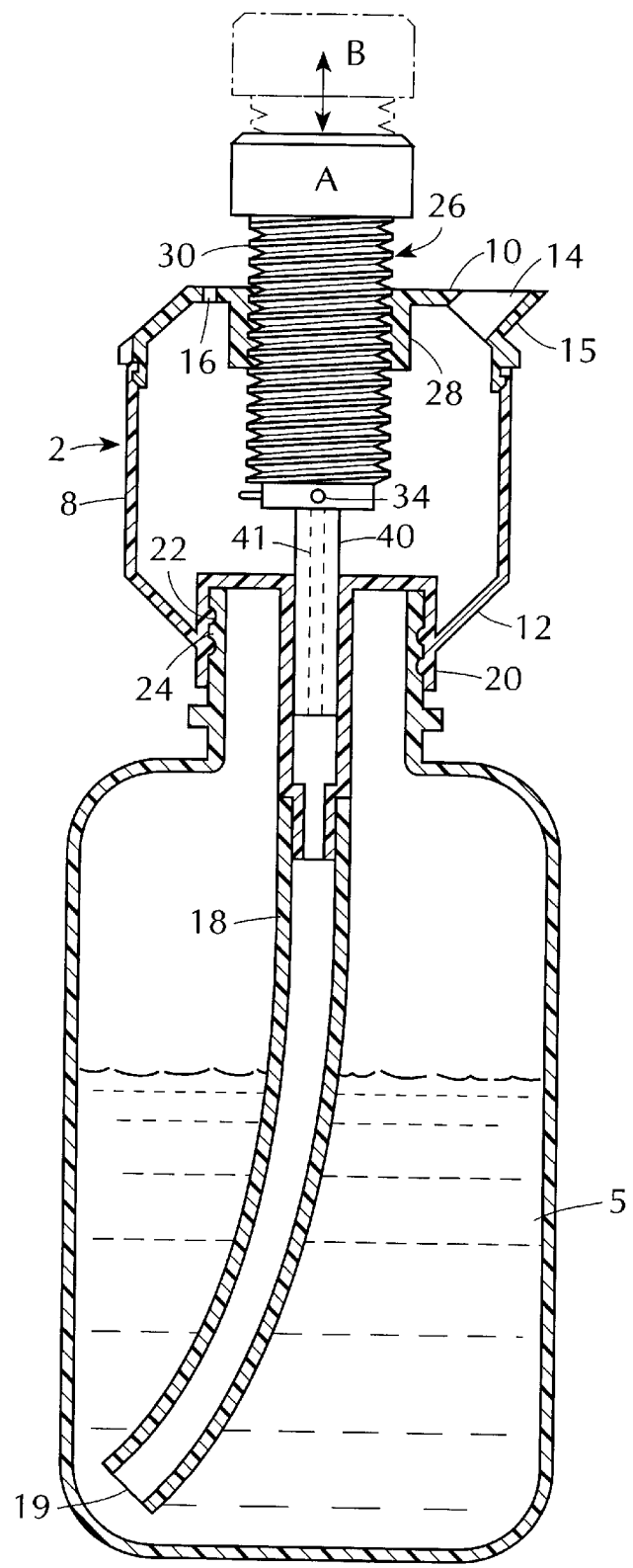
FIG. 4 is an axial section view of the invention of FIG. 1.

Referring to FIGS. 1 to 4 and 8, the dispensing device 2 is designed to be connected to a fluid reservoir, for example a deformable resilient squeeze-type bottle 4. The squeeze-type bottle should be capable of being deformed by, for example, a human hand, in order to force fluid contained therein from the bottle and when released, the bottle should substantially return to its shape before squeezing.

The dispensing device 2 includes a cup 8 having a top wall 10 and a bottom wall 12. The top wall 10 has a pourable orifice 14, preferably including a spout 15, from which the fluid in the cup 8 may be removed from the device 2. An air opening 16 is also present in the top wall 10 in order to permit the entry of air into the cup when pouring the fluid from the cup 8. The air opening 16 is positioned in the top wall, preferably diametrically opposed to the pourable orifice 14 so that the amount of fluid passing through the air opening 16 during the pouring process is minimized.

The bottom wall 12 is connected to a fluid conduit 18, with a distal end 19, which extends into the deformable squeeze-type bottle 4 and permits fluid communication between the dispensing device 2 and the contents of the bottle 4. The bottom wall 12 also can include a coupling means 20 in order to securely position the dispensing device 2 on the deformable squeeze-type bottle 4. The coupling means can take the form of a threaded portion 22 which is cooperative with a complementary threaded portion 24 on the bottle 4.

The top wall 10 also includes a central column 26 passing through an axial threaded opening 28. The central column 26 includes a threaded portion 30 which is cooperative with the axial threaded opening 28. The central column also includes a knob 32 and at least one orifice 34 preferably positioned at the base of the central column 26. Knob 32 permits adjustment of the vertical position of the orifice 34 by turning the knob 32. The interaction of threaded portion 30 and axial threaded opening 28 permits for the vertical movement of the orifice 34 by the rotation of the knob 32, as shown in FIG. 4, for example, and movement from position A to position B, and vice versa.

Figure 5:
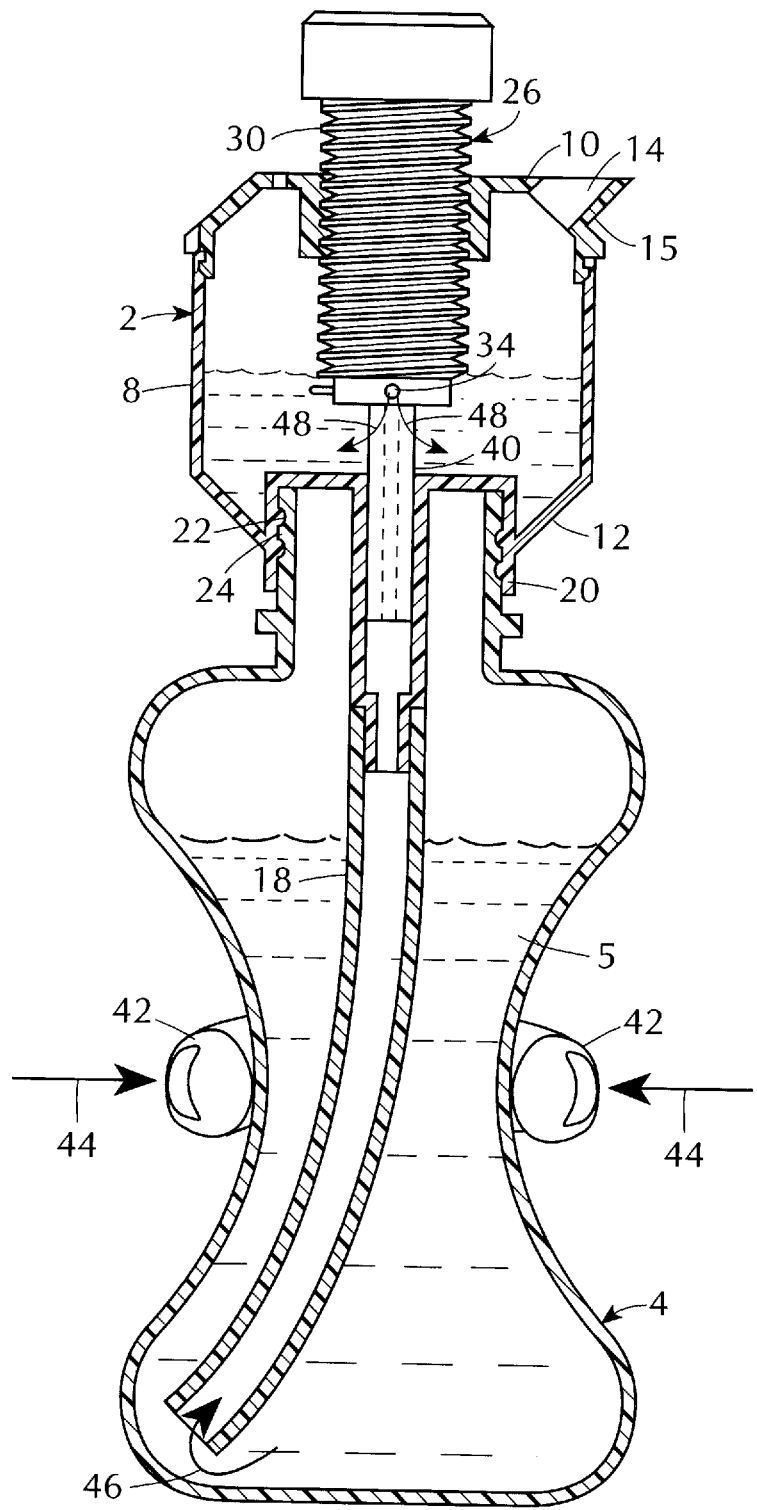
FIGS. 5 and 6 are an axial section views of the invention of FIG. 1 during the operation of the invention of FIG. 1.
Figure 6:
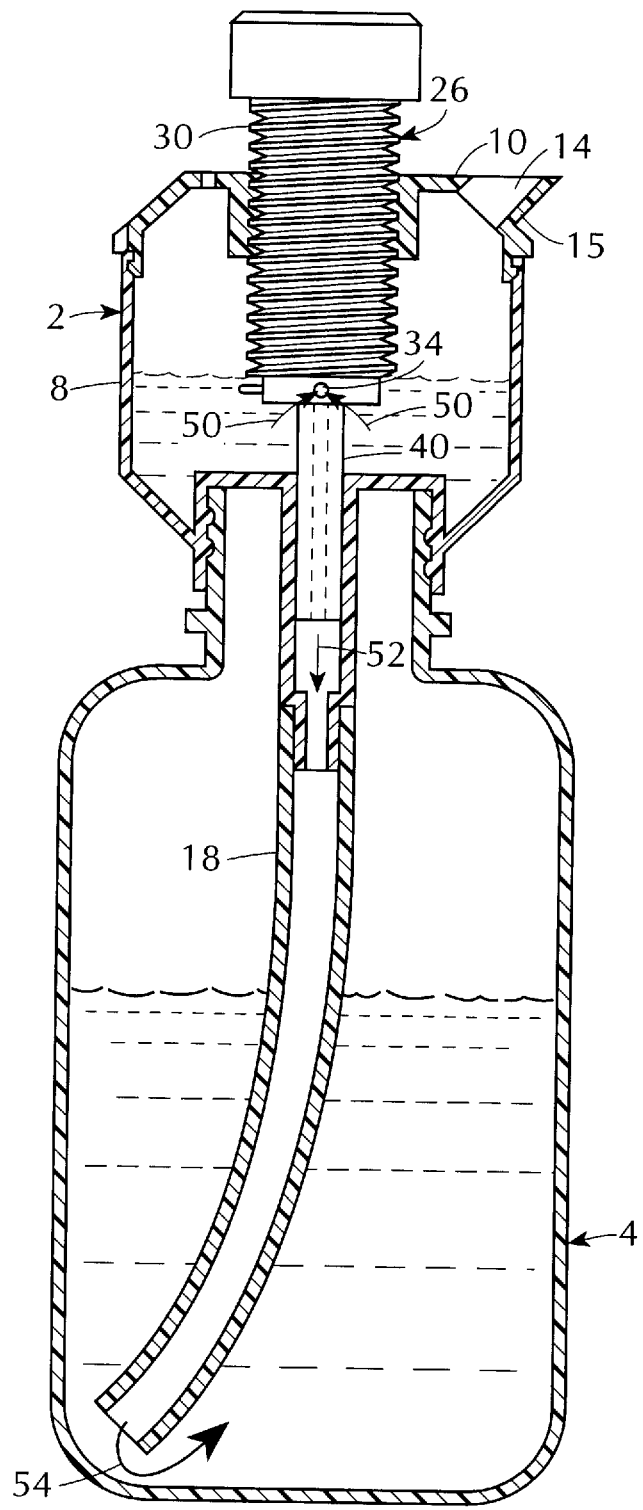

The top wall also includes, in the preferred embodiment, an arrow 36 or other symbol which is used to align an axial measurement scale 38 on the central column 26. The measurement scale 38 corresponds to the volumetric markings 56 on the cup 8. By the user aligning the arrow 36 with the desired amount of fluid on measurement scale 38, the column orifice 34 is positioned at the proper vertical position in the cup 8 for the amount of fluid indicated on measurement scale 38 to be dispensed into cup 8 upon operation of the device as shown in FIGS. 5 and 6. The measurement scale 38 on the column 26 can be in milliliters or fluid ounces.

The central column 26 also includes a tubular portion 40 having a channel 41 which extends from the central column 26 and into the fluid conduit 18. The channel 41 of the tubular portion 40 is in fluid communication with the column orifice 34 as well as with the fluid conduit 18 to permit the flow of fluid from the bottle 4 into the cup 8. The tubular portion 40 is also movable relative to the fluid conduit 18 and annular thereto so as to be movable relative the fluid conduit. However, a substantial seal should be maintained between the tubular portion 40 and the fluid conduit 18 throughout the central column's vertical range of movement.

The fluid conduit 18, in the preferred embodiment, should have a bend so that the distal end 19 of the tube opposes the pourable orifice 14. This minimizes the amount of fluid which could flow from the bottle 4, through the fluid conduit 18, and out the column orifice 34 upon the bottle 4 being tilted to pour the fluid out of the dispensing device. Further, the fluid conduit 18, even with the bend should be of a length so as to extend to the bottom of the bottle 4, so as to maximize the amount of fluid in the bottle 4 which can be deposited in the dispensing device and minimize waste.

In the preferred embodiment, the radial position of the pourable orifice 14, air opening 16, and column orifice 34 is important. In order to minimize the amount of fluid which is lost out the pourable orifice 14 and the air opening 16 during the filling process, the pourable orifice 14 is radially positioned approximately 90 degrees from the column orifice 34.

The operation of the dispensing device is shown in FIGS. 5 and 6. In order to urge fluid into the dispensing device 2, the deformable squeeze-type bottle 4 containing fluid and to which the dispensing device is mounted, as shown in FIG. 5, is squeezed by, for example, two fingers 42 in the direction of arrows 44 which forces the fluid up the fluid conduit 18 in the direction indicated by arrow 46. The fluid then proceeds up the fluid conduit 18, through the tubular portion 40 of central column 26, out the column orifice 34, and into the cup 8 of the dispensing device 2 as indicated by arrows 48. The dispensing device continues to fill with the fluid until the amount of volume displaced by squeezing the bottle is deposited in the bottle 4. In order for the dispensing device to operate at it optimum and place the desired amount of fluid in the cup 8, an excess of fluid should be deposited in the cup 8 above the level of the column orifice 34. When the cup is thusly filled to excess, as is shown in FIG. 5, once fingers 42 are removed from the bottle 4 and the squeeze bottle proceeds to return to its normal shape, as shown in FIG. 6, the amount of fluid above the level of column orifice 34 is returned to the bottle 4 by reverse pressure, proceeding back through the column orifice 34 as shown by arrows 50, into the fluid conduit 18, as shown by arrow 52, out the fluid conduit 18 and back into the bottle 4, as shown by arrow 54. This reverse pressure process proceeds until the fluid in the cup 8 reaches the level of the column orifice 34, at which point the reverse flow ceases since the desired amount of fluid has been reached.

Figure 9:
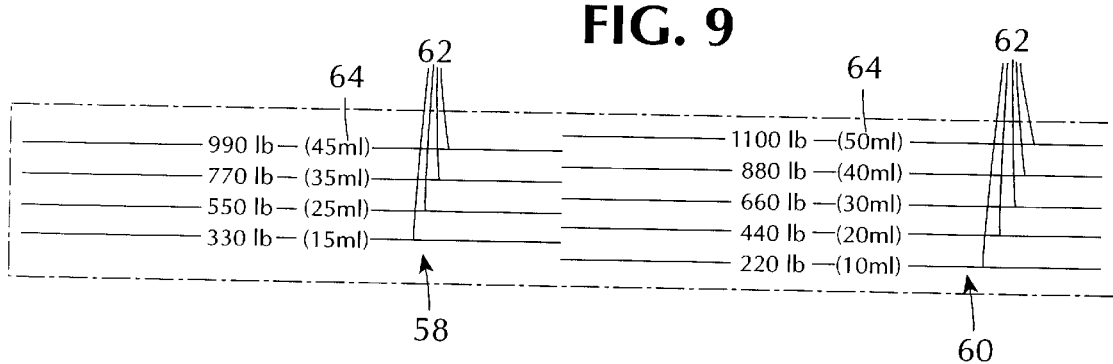
FIG. 9 is a developed view of the volumetric markings of the invention of FIG. 1.
Figure 8:
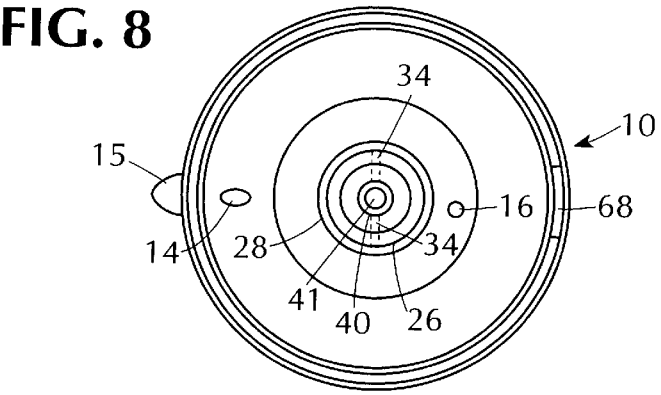
FIG. 8 is a view taken along sight line 8—8 of the invention of FIG. 7.

In the preferred embodiment, the dispensing device includes volumetric markings 56 so as to provide the user with a direct way of visually confirming the amount of fluid dispensed in the device 2. In its most preferred embodiment, there are two sets of markings 58 and 60, as shown in FIG. 9, which shows a developed view of the volumetric markings on the cup 8 of FIGS. 1 and 3. The purpose for the two sets is to provide the user with greater accuracy in visually confirming the amount of fluid in the cup 8. As shown in the most preferred embodiment, between the two sets of markings, it is possible to provide a gradient in increments of five milliliters. The alternatives, which are less efficient, are to either use one set of markings in increments of ten milliliters which is less accurate or to use one set of markings in increments of five milliliters, where the lines are too close together and more difficult to read. The volume measurement scale 62 and the volumetric marking 64 cooperate to allow for a quick reading of the volume level.

Figure 7:
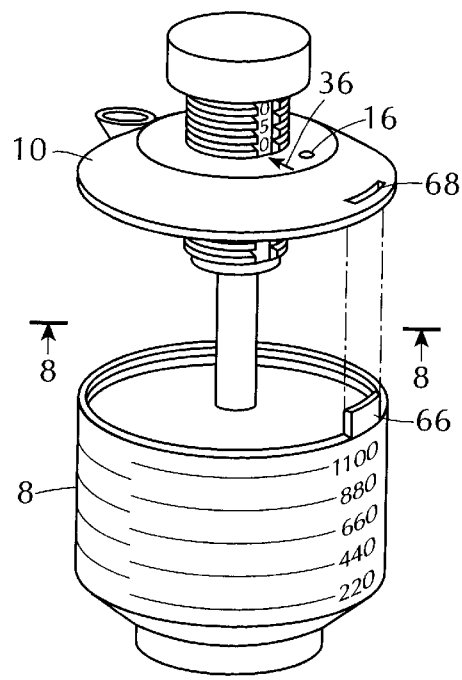
FIG. 7 is an exploded perspective view of the top portion of the invention of FIG. 1.

As shown in FIG. 7, the preferred embodiment also includes a flange 66 on the rim of cup 8 which is cooperative with a slot 68 in the top wall 10. The flange 66 and corresponding slot 68 are positioned on their respective components in order to provide for consistent alignment of the top wall 10 relative to the remainder of the cup structure 8.

We claim:

1. A fluid dispensing device comprising:
   a cup having a bottom wall and a top wall, said top wall including an orifice to permit removal of fluid from said cup and a threaded axial opening; said bottom wall being coupled to a conduit adapted for communication with fluid in a reservoir; and
   a column rotatably positioned in said axial opening and extending therefrom into and out of said cup,
   said column including an orifice positioned in said cup,
   said column including a threaded portion being cooperative with said threaded axial opening such that the position of the column orifice in said cup can be varied through a range of movement by rotation of said column, and
   said column further including a tubular portion being in fluid communication with said column orifice and with said conduit and movable relative to said conduit while substantially maintaining a seal therebetween throughout the range of movement of the orifice in said cup.

2. The fluid dispensing device of claim 1, further including means for coupling said device to a reservoir.

3. The fluid dispensing device of claim 2, wherein said reservoir is a bottle.

4. The fluid dispensing device of claim 2, wherein said coupling means includes said dispensing device including a threaded portion and said reservoir including a complementary threaded portion.

5. The fluid dispensing device of claim 1, further including an air opening in said top wall.

6. The fluid dispensing device of claim 5, wherein said air opening is substantially diametrically opposed to said top wall orifice.

7. The fluid dispensing device of claim 1, wherein said column orifice is displaced substantially radially 90° from the orifice of said top wall.

8. The fluid dispensing device of claim 1, wherein said central column includes a plurality of column orifices.

9. The fluid dispensing device of claim 8, wherein at least one of said column orifices is displaced substantially radially 90° from the orifice of said top wall.

10. The fluid dispensing device of claim 1, wherein said conduit has a length and a distal end with said length having a curvature so as to point the distal end of the conduit in a direction substantially diametrically opposed to the top wall orifice.

11. A fluid dispensing device comprising:
    a cup having a bottom wall and a top wall, said top wall including a first orifice to permit removal of fluid from said cup, a threaded axial opening, and an air opening, wherein said air opening is substantially diametrically opposed to said first orifice; said bottom wall being coupled to a conduit adapted for communication with fluid in a reservoir, wherein said conduit has a distal end and a curvature such that the distal end of said conduit is substantially diametrically opposed to said first orifice; and a column rotatably positioned in said axial opening and extending therefrom into and out of said cup, said column including a second orifice positioned in said cup, wherein said second orifice is substantially radially 90° from said first orifice, said column including a threaded portion being cooperative with said threaded axial opening such that the position of the second orifice in said cup can be varied through a range of movement by rotation of said column, and said column further including a tubular portion being in fluid communication with said second orifice and with said conduit and movable relative to said conduit while substantially maintaining a seal therebetween throughout the range of movement of the second orifice in said cup.

12. The fluid dispensing device of claim 11, further including means for coupling said device to a reservoir.

13. The fluid dispensing device of claim 12, wherein said reservoir is a bottle.

14. The fluid dispensing device of claim 12, wherein said coupling means includes said dispensing device including a threaded portion and said reservoir including a complementary threaded portion.

15. The fluid dispensing device of claim 11, wherein said central column includes a plurality of second orifices.

* * * * *